3,530,217
TOPICAL COMPOSITIONS COMPRISING CORN COB CELLULOSE POWDER

Cleveland J. White, Oak Park, Ill., and Richard M. Cox, Cornwallville, N.Y., assignors to Stiefel Laboratories, Inc., Oak Hill, N.Y., a corporation of New York
No Drawing. Filed Apr. 1, 1966, Ser. No. 539,311
Int. Cl. A61k 7/00
U.S. Cl. 424—180      12 Claims

ABSTRACT OF THE DISCLOSURE

A therapeutic composition for the treatment of acne and related conditions comprises a dispersion or suspension of corn cob cellulose having a particle size of from about 100 mesh to 400 mesh (Tyler Standard) in an aqueous or water-containing fluid medium. The composition contains from about 1 to 25% by weight of cob powder and from 10 to 99% by weight water, together with other spreading, emulsifying and/or gelling agents to give the composition the desired consistency.

---

Acne and seborrhea are conditions of the human skin characterized by an excessive flow of sebum, or skin oil, from the sebaceous glands which are located in the pilosebaceous apparatus. The channel through which sebum reaches the skin surface is the duct of the hair follicle. The presence of excessive amounts of sebum on the skin acts to block or stagnate the continuous flow of sebum from the follicular duct, thus producing a thickening of the sebum which becomes a solid plug known as a comedone. When this occurs, hyperkeratinization of the follicular opening is stimulated, thus completely closing the duct. The usual result is a papule, a pustule, or a cyst, often contaminated with bacteria which cause secondary infections. These occurrences characterize the disease state known as acne, and in lesser severity, seborrhea.

Many topical therapeutic agents are employed in the treatment of acne and seborrhea (1) to prevent the blocking of the follicular duct, (2) to reopen it once it has become blocked by, for example, removing excess keratin or causing it to sluff off, (3) to penetrate into the follicle and act against the infecting bacteria or the thickened sebum, (4) to remove, dissolve, or absorb excessive sebum, or (5) to provide various combinations of each of these actions. Some of the agents currently in use for the purpose of counteracting the excessive flow of sebum are absorbent compounds including, but not limited to talc, mineral clays, starch, compounds of zinc, titanium and zirconium, colloidal alumina, gums, and the like. However, most of these agents have disadvantages in their use in that they may be low in absorptive capacity, or inherently toxic if absorbed into the body through the skin, or supportive to the growth of molds, bacteria and other microorganisms, or difficult to apply either alone or in a pharmaceutical preparation, or cosmetically objectionable due to their odor, color, etc.

Finely divided corn cob cellulose derived from the cob of maize (Zea mays) is known to be a very effective absorbent for water and other liquids. For example, powdered corn cob cellulose having a particle size within the range of from about minus 100 to about plus 400 mesh (Tyler Standard) is able to absorb and retain up to four or more times its weight of water. However, to the best of our knowledge corn cob cellulose has not been used successfully for the purpose of absorbing sebum in the treatment of acne. This may be due to the fact that the absorbent properties of corn cob cellulose are generally attributed to the ability of the dry material to attract and hold, by capillary attraction, water and other liquids in the pores and interstices of the particles, and these properties have heretofore been exploited by employing the dry material as, or as a component of, a dusting powder. However, dry powder preparations are not well suited for use in the topical treatment of acne, and the incorporation of corn cob cellulose in a more conventional liquid, semi-liquid or semi-solid base preparation would ordinarily be expected to block or destroy the absorbent properties of the material.

We have now made the surprising discovery that corn cob cellulose can be incorporated in certain liquid, semi-liquid and semi-solid base preparations, and that the resulting liquid suspension or lotion or cream or ointment, as the case may be, can be used topically in the treatment of acne, without adversely affecting the ability of the corn cob cellulose to serve as an absorbent for excess sebum. Our new therapeutic composition for the treatment of acne comprises a uniform dispersion of corn cob cellulose powder in a water-containing fluid medium that is compounded to permit the full absorptive properties of the corn cob cellulose to be available for the absorption of sebum when the composition is applied to the skin of a patient. The composition contains from about 1 to 25%, and preferably from about 3 to 20%, by weight of corn cob cellulose having a particle size ranging from about minus 100 mesh to about plus 400 mesh (Tyler Standard) and from about 10% to 99% by weight water, the weight of the water being at least equal to, and preferably at least twice, the weight of the corn cob cellulose constituent of the composition. The composition also advantageously contains suspending or dispersing agents to help form a stable suspension or dispersion of the cob powder cellulose in the aqueous base as well as up to about 25% by weight of water-soluble organic humectants and skin conditioners. Antibacterial agents for combating local infections associated with acne, keratolytic agents for promoting the removal of excess keratin from the skin, as well as astringents, drying agents, oxidizing agents, surfactants and other substances known to be effective in the treatment of acne may also be present in the composition. Moreover the composition may contain waxes, emollients, skin lubricants, gels, perfuming agents, tinting agents and other substances known to be useful in the preparation of cosmetically and pharmaceutically elegant compositions.

The corn cob cellulose constituent of our new therapeutic composition is obtained by grinding, or otherwise physically reducing, the cob of maize (Zea mays) to produce a fine powder preferably having a particle size such that substantially all of the powder will pass through a 100 mesh screen and will be retained on a 400 mesh screen (Tyler standard). The maize cob in transverse section comprises three zones. The outer zone, comprising approximately two-fifths of the depth of the cob, is known as the glume. The intermediate zone, comprising approximately another two-fifths of the cob, is known as the woody ring portion of the cob, and the inner zone or core of the cob is known as the pith. Generally speaking, the most desirable part of the cob for the purpose of this invention is the pith while the least desirable part is the glume portion of the cob. However, all portions of the cob have been successfully employed in our new therapeutic composition. The ground corn cob powder comprises about 99% pure cellulose in a form that will absorb at least four times, and under certain circumstances the pith portion will absorb up to 24 times, its weight of water.

The composition of our invention may contain from about 1% to about 25% and preferably between about 3 and 20%, by weight of corn cob cellulose powder, the balance of the composition being a water-containing, and preferably a water-soluble, fluid medium. The consistency of the composition may range any where from that of a relatively thin aqueous suspension to a relatively thick paste or viscous ointment depending on the corn cob cellulose content of the composition and the formulation of the fluid medium in which the cob powder is dispersed. For example, a composition containing 1% by weight corn cob cellulose and the balance mainly water is a thin, watery suspension or lotion, whereas a composition containing 25% by weight corn cob cellulose and the balance mainly water is a thick pasty material. The addition of suspending and dispersing agents, humectants, skin conditioners, kerotolytic agents, emollients and the like to the composition results in a composition having a consistency somewhere between the aforementioned extremes of a thin suspension and a thick paste as well as one possessing desirable therapeutic and cosmetic qualities. These additional constituents are added to the composition in amounts such that the composition will contain corn cob cellulose powder and water in the quantities specified herein, the important consideration being that the cob powder is dispersed in a liquid medium containing sufficient water to prevent the absorptive properties of the cob powder from being blocked or destroyed when the composition is spread in a thin layer on the surface of the skin. As previously noted, the quantity of water required to obtain this result is at least equal to the quantity (that is, the weight) of corn cob powder present in the composition, and preferably the composition contains at least two or more times as much water as it does cob powder.

The water-containing composition of our invention advantageously contains one or more agents which serve to promote and maintain a stable suspension or dispersion of the corn cob cellulose particles in the aqueous fluid medium. Suspending and dispersing agents employed as a component of our composition include, but are not necessarily limited to, mineral clays such as bentonite, siliceous gums and clays, vegetable gums such as acacia, tragacanth, chondrus and the like, synthetic suspending and gelling agents such as the carboxy vinyl polymers, synthetic waxes such as the polyethylene glycols, methyl cellulose, ethyl cellulose, carboxy methyl cellulose, and microcrystalline cellulose. The quantity of the aforesaid agents employed in the composition will, of course, vary as circumstances warrant. However, by way of example, in a composition that consists essentially of corn cob cellulose, water and a suspending agent, the weight of the suspending agent is advantageously one fourth that of the cob powder constituent of the composition.

The consistency and cosmetic acceptability of the composition can be significantly improved by the inclusion of organic humectants, skin conditioners, oils and emollients in the water-containing fluid medium. The humectants and skin conditioners useful in our new composition are water-soluble and advantageously are sufficiently volatile (for example, having a boiling point below about 300° C.) so that they tend to evaporate when the composition is spread in a thin layer on the skin of a patient. However, they are not necessarily so limited and include, but are not limited to, propylene glycol, polyethylene glycols, hexylene glycols, butylene glycol, glycerin, ethyl alcohol, isopropyl alcohol, acetone and the like. Moreover, the composition can contain oily and fatty substances such as liquid petrolatum and fatty acid esters, in which case the composition also contains surfactants and emulsifiers which promote homogeneous blending of the aqueous and non-aqueous phases of the composition. The quantity of the organic humectants, skin conditioners, oils and emollients present in the composition will depend on and determine whether the composition is to have the consistency of a lotion, cream or ointment. For example, a composition containing about 5% corn cob cellulose, 10% propylene glycol and the balance mainly water has the consistency of a moderately creamy lotion, whereas a composition containing about 5% corn cob cellulose, 70% polyethylene glycol 4000 and the balance essentially water has the consistency of a moderately viscous ointment. In addition, the water-containing liquid medium may, if desired, have the consistency of a jelly. This is achieved by incorporating in the aqueous medium gelling compounds such as methyl cellulose, carboxy vinyl polymers, natural or synthetic gums and the like which, when gelled, impart to the fluid medium the consistency of a jelly.

The composition, as previously noted can also contain keratolytic and antibacterial agents known to be beneficial in the topical treatment of acne. Keratolytic agents commonly present in such therapeutic compositions include sulfur, resorcinol, salicylic acid, benzoyl peroxide and the like, and our new composition advantageously can contain up to about 10% or more of these agents. Antibacterial agents commonly employed in acne treatment compositions include, but are not limited to, hexachlorophene in amounts ranging from 0.1 to 2.0% by weight of the composition, para-chloro-metaxylenol in like amounts, tyrothricin in a concentration of 0.5 mg. per gram of the total composition, Neomycin sulfate in a concentration of approximately 3.5 mg. (base equivalent) per gram of the total composition, Benzalkonium chloride in amounts ranging from about 0.01% to 0.17 and Bithional in amounts ranging from about 0.5% to 1% of the composition.

The corn cob cellulose and water-containing fluid medium are thoroughly blended together by conventional means to form a uniform dispersion of the cob powder in the fluid medium. When the fluid medium contains organic substances which are not water soluble or which have a relatively high boiling point, such as, for example, liquid petrolatum or polyethylene glycol, the corn cob powder is advantageously first wet or moistened with water which is absorbed in the pores and interstices of the cob particles prior to mixing the cob powder with the remaining constituents of the composition. After thorough blending of the various constituents of the composition, the resulting dispersion of corn cob cellulose is then applied to the skin of a patient by rubbing the composition thereon to form a thin layer from which the volatile constituents of the composition can readily evaporate. Upon evaporation of the water and other volatile constituents of the composition, the corn cob cellulose particles remaining on the skin are available to absorb the excess sebum which is associated with acne and related disorders.

The following examples are illustrative but not limitative of therapeutic compositions prepared in accordance with our invention.

EXAMPLE I

Corn cob cellulose having a particle size of plus 100 mesh and minus 400 mesh (Tyler Standard) is thoroughly blended with water and a suspending agent (comprising in various compositions bentonite, vegetable gums, synthetic suspending agents such as polyethylene glycol and the like) to form an aqueous suspension of the cob powder. The suspensions contain from 1 to 25% by weight corn cob cellulose, from 0.25 to 6.25 by weight of suspending agents and the balance essentially water. Representaitve compositions are as follows:

|  | Percent by weight | | |
| --- | --- | --- | --- |
| Corn cob cellulose | 1 | 10 | 20 |
| Suspending agent | 0.25 | 2.5 | 5 |
| Water | Bal. | Bal. | Bal. |

EXAMPLE II

The compositions of Example I are modified by the addition thereto of an organic humectant and skin conditioner in lieu of a corresponding quantity of water. These compositions have the consistency of a lotion. Representative compositions are as follows:

|  | Percent by weight | | |
| --- | --- | --- | --- |
| Corn cob cellulose | 3 | 8 | 15 |
| Suspending agents | 0.75 | 2 | 3.75 |
| Propylene glycol | 10 | 10 | 10 |
| Water | Bal. | Bal. | Bal. |

EXAMPLE III

The compositions of Example I are further modified by the addition thereto of keratolytic agents, antibacterial agents and a small quantity of a fatty acid ester and emulsifiers therefor. These compositions have the consistency of a workable cream. Representative compositions are as follows:

|  | Percent by weight | | |
| --- | --- | --- | --- |
| Corn cob cellulose | 1 | 5 | 16 |
| Propylene glycol | 5 | 5 | 5 |
| Sulfur | 1 | 5 |  |
| Resorcinol | 5 |  | 2 |
| Salicylic acid |  | 5 | 3 |
| Isopropyl palmitate | 3 | 2 | 1 |
| Glyceryl monostearate | 3 | 2 | 3 |
| Polysorbate 80 [1] | 1 | 2 | 5 |
| Antibacterial agents | 0.5 | 0.5 | 0.5 |
| Water | Bal. | Bal. | Bal. |

[1] Polyoxyethylene (20) sorbitan mono-oleate.

EXAMPLE IV

Corn cob cellulose powder, a synthetic gelling compound and an organic humectant are thoroughly mixed with and dispersed in water. The humectant is propylene glycol and the gelling compound is a carboxy vinyl polymer available commercially under the trade name Carbopol 934. Upon the addition of sodium hydroxide to the aqueous dispersion, the gelling compound hydrolyzes and forms a gell in which the cob powder particles are uniformly dispersed. Representative compositions are as follows:

|  | Percent by weight | | |
| --- | --- | --- | --- |
| Corn cob cellulose | 1 | 10 | 20 |
| Propylene glycol | 5 | 1 | 5 |
| Carbopol 934 | 0.5 | 1 | 0.1 |
| Sodium hydroxide | 0.25 | 0.5 | 0.05 |
| Water | Bal. | Bal. | Bal. |

EXAMPLE V

Corn cob cellulose powder is mixed with a synthetic water soluble wax and water to form a water soluble ointment. The synthetic wax employed is composed of chains of ethylene oxide glycols having an average molecular weight of 4000 and is available commercially under the name polyethylene glycol 4000. The composition contains from 50 to 75% by weight polyethylene glycol 4000 and about 24 to 25% by weight water, and it has the consistency of an ointment. Representative compositions are as follows:

|  | Percent by weight | |
| --- | --- | --- |
| Corn cob cellulose | 5 | 15 |
| Polyethylene glycol 4000 | 70 | 60 |
| Water | Bal. | Bal. |

EXAMPLE VI

Corn cob cellulose powder is mixed first with water and an organic humectant and then is blended with and dispersed in liquid petrolatum containing an emulsifier for the aqueous phase to make a water soluble ointment. The composition contains from 1 to 25% by weight of corn cob cellulose, from 5 to 10% by weight of the organic humectant, from 40 to 60% by weight of water, from 30 to 40% by weight of liquid petrolatum, and from 3 to 6% by weight of the emulsifier for the aqueous phase of the composition. Representative compositions are as follows:

|  | Percent by weight | |
| --- | --- | --- |
| Corn cob cellulose | 2 | 17 |
| Propylene glycol | 5 | 10 |
| Water | 48 | 40 |
| Sorbitan sesquioleate | 5 | 3 |
| Liquid petrolatum | 40 | 30 |

All of the compositions described in the foregoing specific examples are capable of absorbing excess sebum when applied in a thin layer onto the surface of the skin. Accordingly, it will be seen that our new therapeutic composition for the treatment of acne comprises an important contribution to the art to which our invention relates.

We claim:

1. A therapeutic composition for the topical treatment of acne comprising a uniform dispersion of corn cob cellulose powder in a water-containing fluid medium, said composition containing from about 1 to 25% by weight of corn cob cellulose having a particle size of from about minus 10 mesh up to about plus 400 mesh (Tyler Standard), from about 10 to 99% by weight water, and an organic substance known to be useful in the preparation of cosmetically and pharmaceutically elegant compositions that is water-insoluble or of a relatively high boiling point but one below about 300° C., the weight of the water in the composition being at least equal to the weight of the corn cob cellulose constituent of the composition, the pores and interstices of said corn cob cellulose powder being impregnated with said water.

2. The therapeutic composition according to claim 1 in which the composition contains up to about 10% by weight at least one suspending agent for the corn cob cellulose constituent of the composition.

3. The therapeutic composition according to claim 2 in which the suspending agent is selected from the group consisting of mineral clays, siliceous gums and clays, vegetable gums, carboxy vinyl polymers, polyethylene glycols, methyl cellulose, ethyl cellulose, carboxy methyl cellulose and microcrystalline cellulose.

4. The therapeutic composition according to claim 1 in which the composition contains up to about 75% by weight of at least one water-soluble organic humectant having a boiling point of below about 300° C.

5. The therapeutic composition according to claim 4 in which the organic humectant is selected from the group consisting of propylene glycol, polyethylene glycols, hexylene glycols, butylene glycol, glycerin, ethyl alcohol, isopropyl alcohol and acetone.

6. The therapeutic composition according to claim 1 in which the composition contains up to about 10% by weight of at least one keratolytic agent.

7. The therapeutic composition according to claim 6 in which the keratolytic agent is selected from the group consisting of sulfur, resorcinol, salicylic acid and benzoyl peroxide.

8. The therapeutic composition according to claim 1 in which the composition contains up to about 2% by weight of at least one antibacterial agent.

9. The therapeutic composition according to claim 1 in which the composition contains up to about 10% by weight of at least one fatty acid ester and up to about 10% by weight of at least one emulsifying agent for said ester, whereby the composition has the consistency of a cream.

10. The therapeutic composition according to claim 1 in which the composition contains a gelling compound for the water constituent of the composition and a gelling agent for said gelling compound, whereby said composition has the consistency of a jelly.

11. The therapeutic composition according to claim 1 in which the composition contains from about 50 to 75% by weight of a water soluble synthetic wax and about 24 to 25% by weight water, whereby the composition has the consistency of an ointment.

12. The therapeutic composition according to claim 1 in which the composition contains from about 30 to 40% by weight of liquid petrolatum, from 40 to 60% by weight of water and from 3 to 6% by weight of an emulsifying agent for the water content of the composition, whereby the composition has the consistency of an ointment.

References Cited

UNITED STATES PATENTS 2,890,151   6/1959   White _____ 167—58

OTHER REFERENCES

Frazier et al.: A Formulary for External Therapy of the Skin, published by Charles C. Thomas, Springfield, Ill., 1954 pages 100–105.

Dispensatory of the United States of America, 25th edition, published by J. B. Lippincott Co., Philadelphia, 1955, page 1311.

RICHARD L. HUFF, Primary Examiner

U.S. Cl. X.R.

424—162, 346, 230, 338, 312